United States Patent
Qama et al.

(10) Patent No.: US 12,442,667 B2
(45) Date of Patent: Oct. 14, 2025

(54) INDUCTIVE POSITION SENSOR FOR DETECTING A LINEAR OR ANGULAR MOVEMENT OF A CONDUCTIVE TARGET

(71) Applicant: Renesas Electronics America Inc., Milpitas, CA (US)

(72) Inventors: Gentjan Qama, Munich (DE); Andreas Leo Buchinger, Ilz (AT); Bence Gombor, Ilz (AT); Rudolf Pichler, Ilz (AT); Harald Hartl, Ilz (AT)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 18/336,253

(22) Filed: Jun. 16, 2023

(65) Prior Publication Data
US 2023/0408297 A1    Dec. 21, 2023

(30) Foreign Application Priority Data
Jun. 17, 2022   (EP) .................................. 22179580

(51) Int. Cl.
    *G01D 5/20*         (2006.01)
(52) U.S. Cl.
    CPC ......... *G01D 5/2073* (2013.01); *G01D 5/2053* (2013.01)
(58) Field of Classification Search
    CPC ........................... G01D 5/2073; G01D 5/2053
    See application file for complete search history.

(56) References Cited

U.S. PATENT DOCUMENTS

| | | | |
|---|---|---|---|
| 4,853,604 A * | 8/1989 | McMullin | G01P 3/42 318/653 |
| 7,045,996 B2 * | 5/2006 | Lyon | G01D 21/00 324/207.16 |
| 7,208,945 B2 * | 4/2007 | Jones | G01D 5/2073 324/228 |
| 11,137,267 B2 | 10/2021 | Utermoehlen et al. | |
| 2008/0116883 A1 * | 5/2008 | Ruehl | G01D 5/2093 324/207.17 |

(Continued)

FOREIGN PATENT DOCUMENTS

| | | |
|---|---|---|
| DE | 102016202877 B3 | 6/2017 |
| EP | 3865825 A1 | 8/2021 |

OTHER PUBLICATIONS

Extended European Search Report dated Nov. 24, 2022 issued in EP 22179580.0.

*Primary Examiner* — Walter L Lindsay, Jr.
*Assistant Examiner* — Milton Gonzalez
(74) *Attorney, Agent, or Firm* — SCULLY, SCOTT, MURPHY & PRESSER, P.C.

(57) ABSTRACT

An inductive position sensor for detecting a linear or angular movement of a conductive target, including: a transmitter coil; a first receiver coil and a second receiver coil, where the first receiver coil and the second receiver coil have a linear or angular shape and define the detection range of the inductive linear or arc position sensor; a first conductive target and a second conductive target; the first conductive target and the second conductive target each have a linear or angular shape extension of half the detection range of the inductive position sensor and are spaced from each other by half the detection range of the inductive position sensor.

12 Claims, 3 Drawing Sheets

(56) References Cited

U.S. PATENT DOCUMENTS

| | | | |
|---|---|---|---|
| 2011/0101968 A1* | 5/2011 | Brands | G01D 5/2073 |
| | | | 324/207.17 |
| 2018/0224301 A1* | 8/2018 | Herrmann | G01D 5/204 |
| 2020/0025550 A1* | 1/2020 | Utermoehlen | G01B 7/30 |
| 2021/0080243 A1* | 3/2021 | Ocket | G01B 7/003 |
| 2021/0302207 A1* | 9/2021 | Lugani | G01B 7/30 |

* cited by examiner

INDUCTIVE POSITION SENSOR FOR DETECTING A LINEAR OR ANGULAR MOVEMENT OF A CONDUCTIVE TARGET

CROSS-REFERENCE TO RELATED APPLICATION

The subject application claims priority under 35 U.S.C. § 119 to European Patent Application No. EP 22179580, filed on Jun. 17, 2022. The entire disclosure of European Patent Application No. EP 22179580 is incorporated by this reference.

BACKGROUND

An inductive position sensor for detecting a linear or angular movement of a conductive target is disclosed.

Many applications need position feedback of a moving target like a rotating member, for example in a throttle control for motor bicycles. In most cases, an additional position sensor is mounted to the moving part to generate the required position information. Magnetic position sensors and inductive position sensors are known. Since current carrying parts like motor cables or battery cables, a rotating motor package, the stator of the motor or additional equipment like a motor brake cause magnetic fields that may disturb magnetic fields, the use of inductive position sensors is preferred to provide robustness against such magnetic fields.

There are disclosed techniques listed below.
[Patent Document 1] U.S. Pat. No. 4,853,604
[Patent Document 2] US Patent Application No. 2011/0101968
[Patent Document 3] U.S. Pat. No. 7,045,996
[Patent Document 4] U.S. Pat. No. 7,208,945
[Patent Document 5] US Patent Application No. 2008/0116883

Inductive position sensors implement a magnet-free technology, utilizing the physical principles of eddy currents or inductive coupling to detect the position of a target that is moving above a set of coils, consisting for example of one transmitter coil and two receiver coils, such as a sine receiver coil and a cosine receiver coil. Such an inductive sensor system is for example disclosed in Patent Document 1.

In a practical implementation of the three coils, one transmitter coil and two receiver coils, are typically provided as copper traces on a printed circuit board. They are arranged such that the transmitter coil induces a secondary voltage in the two receiver coils, which depends on the position of the conductive, e.g., metallic, target above the receiver coils. Therefore, the inductive sensor comprises or is connected to an oscillator that generates a radio-frequency signal, which is applied to the transmitter coil to create a static high frequency magnetic field. This static high frequency magnetic field is picked up by the receiver coils, for example the sine receiver coil and the cosine receiver coil. Depending on the position of the conductive target above the coils, the secondary voltage picked up by the receiver coils is changing in amplitude, allowing the determination of the target's position by analysing this effect. For example, the target position is calculated by the arctangent of the momentary sine signal amplitude divided by the momentary cosine signal amplitude. The calculation is performed by a processing unit, which is connected to the position sensor or integral part of the position sensor.

In order to process the receiver signals, a complex circuit containing a demodulator, a gain stage, offset and gain mismatch compensation, an analog-to-digital converter and a digital signal processing unit providing some form of arctangent calculation is necessary.

Patent Document 2 discloses an inductive position sensor for determining the position of a movable element. The position sensor comprises two subsystems, each having two transmitter units, an LC resonant circuit on the movable element and a receiver coil with an evaluation unit. The processing of the individual subsystems is carried out alternatively. Thus, if one subsystem is operating, all other subsystems are deactivated. The movable element including the LC resonant circuit rotates within a total electromagnetic field generated by the overlap of the two electromagnetic fields of the two transmitter units. In response, the LC resonant circuit will produce an electromagnetic field, which will be received by the receiver coil and the evaluation unit.

Patent Document 3 discloses a method for determining the position of a device including generating at least two, time-varying, magnetic fields using inductive elements, wherein the fields have different phases. The method further includes detecting a signal modulated on top of the fields, wherein the signal is generated from the device, and determining the position of the device based on a phase difference of the signal from the device and a reference signal. Like Patent Document 2, the disclosed method requires an LC resonant circuit on the moving device.

Patent Document 4 discloses a sensor comprising an excitation winding, a signal generator operable to generate an excitation signal and arranged to apply the generated excitation signal to the excitation winding, a sensor winding electromagnetically coupled to the excitation winding and a signal processor operable to process a periodic electric signal generated in the sensor winding when the excitation signal is applied to the excitation winding by the signal generator to determine a value of a sensed parameter. The excitation signal comprises a periodic carrier signal having a first frequency modulated by a periodic modulation signal having a second frequency, the first frequency being greater than the second frequency. In this way, the sensor is well suited to using digital processing techniques both to generate the excitation signal and to process the signal induced in the sensor windings. In an embodiment, the sensor is used to detect the relative position of two members. In other embodiments, the sensor is used to detect environmental factors such as temperature and humidity.

Patent Document 5 discloses an inductive sensor device and a method for inductive identification comprising a first exciter inductor and a second exciter inductor extending along a measurement range and vary spatially differently from each other. A first inductive coupling element and a second inductive coupling element couple a signal from the two exciter inductors into a receiver inductor. The inductive coupling elements are formed as resonance elements with a first resonance frequency f1 and a second resonance frequency f2. In order to be able to simply determine the position of both inductive coupling elements quickly and accurately, the two exciter inductors are driven by different transmission signals S1, S2. Each of the transmission signals S1, S2 includes signal components of a first carrier frequency near the first resonance frequency f1 varying in temporal progression, and of a second carrier frequency near the second resonance frequency f2 varying in temporal progression.

In an inductive linear position sensor, the receiver coils extend along a linear moving path of the conductive target and the conductive target has a certain linear extension. In an inductive arc position sensor, the receiver coils extend along an angular moving path of the conductive target and the conductive target has a certain angular extension.

Inductive position sensors for detecting a linear or angular movement implementing the design disclosed in Patent Document 5 comprising one transmitter coil, two receiver coils and one conductive target require a receiver coil length extending the detection range of the inductive position sensor by the linear or angular width of the conductive target. Assuming a conductive target having an angular width of e.g., 90° and a detection range of another 90°, the overall length of the two receiver coils is at least 180°. Thus, the length of the receiver coils is always bigger than the detection range of the inductive position sensor.

It is an object to reduce the length of the receiver coils of an inductive position sensor for detecting a linear or angular movement of a conductive target and to increase the accuracy of the inductive position sensor.

SUMMARY

The object can be solved by an inductive linear or arc position sensor for detecting a linear or angular movement of a conductive target, comprising:
- at least one transmitter coil;
- at least a first receiver coil and a second receiver coil, wherein the first receiver coil and the second receiver coil have the same shape and are phase-shifted to each other, wherein the first receiver coil and the second receiver coil have a linear or angular shape and define the detection range of the inductive position sensor;
- at least one oscillator for generating a transmitter signal, wherein the transmitter signal is applied to the transmitter coil;
- at least a first conductive target and a second conductive target, wherein the first conductive target and the second conductive target move above the first receiver coil and the second receiver coil along the detection range in the linear or angular movement;
- wherein the first conductive target and the second conductive target each have a linear or angular shape extension of half the detection range of the inductive position sensor and are spaced from each other by half the detection range of the inductive position sensor.

The transmitter coil is connected to the at least one oscillator for generating an electromagnetic field. The generated electromagnetic transmitter field is picked up by the first receiver coil and the second receiver coil. If no conductive target is placed above the first receiver coil and the second receiver coil, the resulting signal picked up by the first receiver coil and the second receiver coil is zero. If the conductive target is placed above the first receiver coil and the second receiver coil, the generated electromagnetic field induces eddy currents on the surface of the conductive target. The induced eddy currents generate a counter magnetic field, thereby reducing the total flux density underneath. The voltage induced underneath the conductive target is reduced, creating an imbalance in the signals picked up by the first receiver coil and the second receiver coil. Areas that are covered by the conductive target generate a weaker resulting magnetic field and areas that are not covered by the conductive target generate a stronger resulting magnetic field.

Depending on the position of the conductive target above the first receiver coil and the second receiver coil, the secondary voltage picked up by the first receiver coil and the second receiver coil is changing in amplitude, allowing the determination of the target's position by analysing this effect. For example, the target position is calculated by the arctangent of the momentary signal amplitude picked up by the first receiver coil divided by the momentary signal amplitude picked up by the second receiver coil. The calculation is performed by a processing unit, which is connected to the position sensor or integral part of the position sensor.

The first reiver coil and the second receiver coil are superimposed, like e.g., intertwined. Thus, the first receiver coil and the second receiver coil have the same shape, e.g., the same linear or angular extension, and are only phase-shifted to each other. For example, the first receiver coil is a sine receiver coil and the second receiver coil is a cosine receiver coil, which are arranged superimposed but electrically isolated from each other on a common substrate.

For accuracy purposes it is necessary that the conductive target is completely positioned above the first receiver coil and the second receiver coil. Thus, according to a conventional embodiment using one conductive target the detection range of the inductive position sensor corresponds to the linear or angular length of the first receiver coil and the second receiver coil minus the linear or angular extension of the conductive target.

The detection range of the inductive position sensor is increased to the linear or angular length of the first receiver coil and the second receiver coil by providing at least two conductive targets, wherein the first conductive target and the second conductive target each have a linear or angular shape extension of half the detection range of the inductive position sensor, i.e. the linear or angular length of the first receiver coil and the second receiver coil, and are spaced from each other by half the detection range of the inductive position sensor, i.e. the linear or angular length of the first receiver coil and the second receiver coil. The spacing between the first conductive target and the second conductive target is fixed, so that the first conductive target and the second conductive target move simultaneously along the linear or angular detection range of the inductive position sensor. Thus, the first receiver coil and the second receiver coil are completely covered by the first conductive target respectively the second conductive target or partly by the first conductive target and partly by the second conductive target, wherein the sum of the part of the first conductive target and the part of the second conductive target correspond to the area of the first conductive target respectively the second conductive target.

The first conductive target and the second conductive target have the same linear or angular extension and for example cover the first receiver coil and the second receiver coil over the complete transverse or radial direction of the inductive position sensor. For example, the first conductive target and the second conductive target have the same shape.

The linear or angular movement of the first conductive target and the second conductive target is limited to the detection range of the inductive position sensor.

The design of the at least first conductive target and the second conductive target further increases the accuracy of the inductive position sensor. Depending on the linear or angular position of the first conductive target and of the second conductive target the area next to the first receiver coil and the second receiver coil in the linear or angular direction is at least on side covered by either the first conductive target or the second conductive target. In some linear or angular positions of the first conductive target and the second conductive target the areas next to the first receiver coil and the second receiver coil in the linear or angular direction on both sides are covered by the first conductive target respectively the second conductive target. This effectively reduces disturbances, which are for example introduced by the transmitter coil arranged in this area, and thereby enhances the accuracy of the inductive position sensor.

In a variant, the inductive position sensor further comprises a third conductive target, wherein the third conductive target is spaced from the first conductive target and/or the second conductive target by half the detection range of the inductive position sensor. The third conductive target is arranged such that it does not cover the first receiver coil or the second receiver coil along the detection range in the linear or angular movement. However, in one end position of the inductive position sensor the third conductive target is arranged next to the first receiver coil or the second receiver coil and covers the transmitter coil in this position. Thereby, the third conductive target reduces the disturbances introduced by the transmitter coil in this end position.

Pursuant to a variant, the third conductive target has a linear or angular shape extension of half the detection range of the inductive position sensor. Thus, the third conductive target can have the same shape as the first conductive target and the second conductive target. The first conductive target, the second conductive target and the third conductive target move simultaneously and are for example arranged on a common substrate.

According to a variant, the first receiver coil and the second receiver coil each comprise two wire loops, which are wound in opposite directions. For example, the first wire loop has one or more periods in the movement direction of the conductive targets and the second wire loop has one or more periods opposite the movement direction of the conductive targets.

For example, the first receiver coil is wound that it creates two wire loops A and C, which are wound in opposite direction, i.e. clockwise and counterclockwise, depending on the current flowing in them. For instance, the current in the first loop A is flowing counterclockwise, while the current in the second loop C is flowing clockwise. Reversing the polarity of the voltage applied to the terminals of the transmitter coil, also reverses the current flow in the first loop A and the second loop C, now creating a clockwise current flow in the first loop A and a counterclockwise current flow in the second loop C. The electromagnetic fields picked up by the first loop A and the second loop C are always of opposite polarity. Consequently, if no conductive target is placed above the first receiver coil, the voltage of the receiver signal received by the first receiver coil is zero as the fields generated by the first loop A and the second loop C cancel each other.

Since the second receiver coil has the same shape as the first receiver coil and is only phase-shifted, the second receiver coil accordingly is wound such that it creates two wire loops B and D, which are wound in opposite direction, i.e. clockwise and counterclockwise, depending on the current flowing in them. For instance, the current in the first loop B is flowing counterclockwise, while the current in the second loop D is flowing clockwise. Reversing the polarity of the voltage applied to the terminals of the transmitter coil, also reverses the current flow in the first loop B and the second loop D, now creating a clockwise current flow in the first loop B and a counterclockwise current flow in the second loop D. The electromagnetic fields picked up by the first loop B and the second loop D are always of opposite polarity. Consequently, if no conductive target is placed above the second receiver coil, the voltage of the receiver signal received by the second receiver coil is zero as the fields generated by the first loop B and the second loop D cancel each other.

In a variant, the first receiver coil, the second receiver coil and the transmitter coil are arranged on a substrate, wherein the first receiver coil and the second receiver coil are superimposed. For example, the first receiver coil and the second receiver coil are superimposed and the transmitter coil surrounds the superimposed first receiver coil and the second receiver coil. Furthermore, the processing unit can also be arranged on the substrate. For example, the substrate is a printed circuit board and the first receiver coil, the second receiver coil and the at least one transmitter coil are formed by copper traces on the substrate.

Pursuant to a variant, the transmitter coil encircles the first receiver coil and the second receiver coil.

According to a variant, the first conductive target, the second conductive target and/or the third conductive target are arranged on a common substrate. Thereby, the spacing between the first conductive target, the second conductive target and/or the third conductive target is guaranteed and the first conductive target, the second conductive target and/or the third conductive target move simultaneously along the detection range in the linear or angular movement.

In a variant, the inductive position sensor is an inductive arc position sensor and the detection range of the inductive position sensor is 180° or less, 90° or less, 60° or less or 30° or less. For a detection range of 180° the angular width of the first conductive target and the second conductive target is 90° and the spacing between the first conductive target and the second conductive target is 90°.

According to an alternative variant, the inductive position sensor is an inductive linear position sensor, and the first conductive target and the second conductive target can move along a movement path, wherein the first receiver coil, the second receiver coil and the at least one transmitter coil are arranged along the movement path.

The conductive target can be any kind of metal, such as aluminium, steel or a printed circuit board with a printed copper layer. Usually, an inductive position sensor comprises a metallic target.

BRIEF DESCRIPTION OF THE DRAWINGS

In the following, embodiments of an inductive position sensor will be further explained with reference to the drawings. The drawings show.

DETAILED DESCRIPTION

Figure 1:
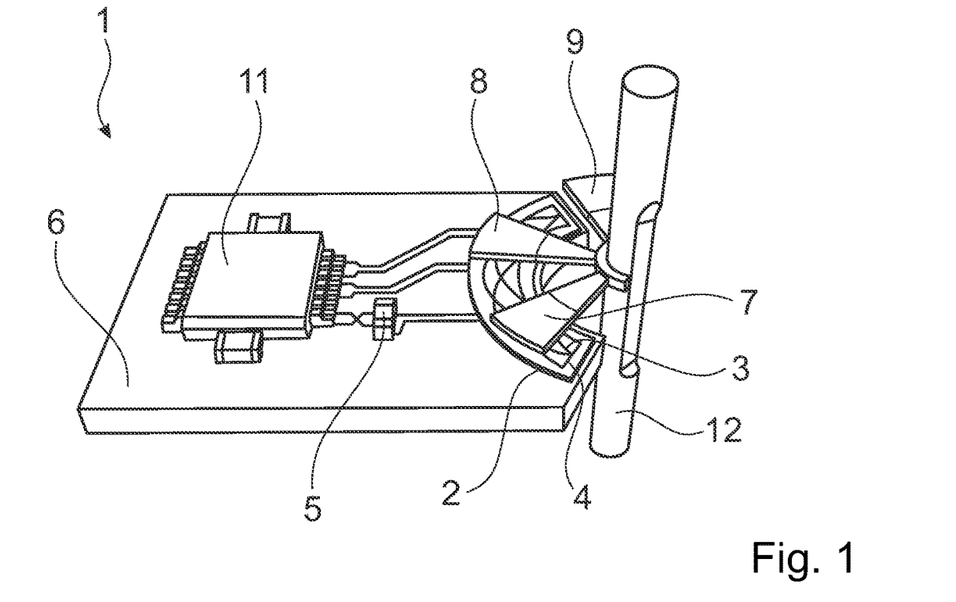
FIG. 1 a schematic view of a first embodiment of an inductive position sensor.
Figure 2:
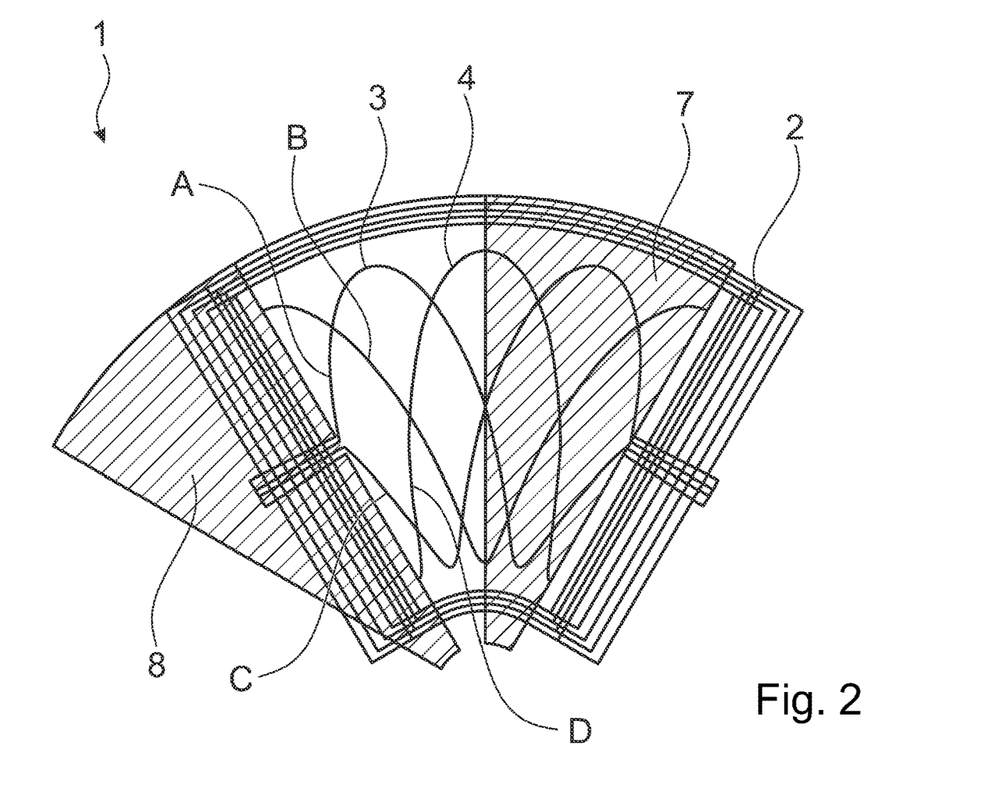
FIG. 2 a schematic view of parts of a second embodiment of an inductive position sensor, FIG. 3 a schematic view of parts of a third embodiment of an inductive position sensor, FIG. 4 a schematic view of parts of a fourth embodiment of an inductive position sensor, FIG. 5 a schematic view of parts of a fifth embodiment of an inductive position sensor.

FIG. 1 shows a schematic view of a first embodiment of an inductive position sensor 1. The inductive position sensor 1 shown in FIG. 2 is an inductive arc position sensor for detecting an angular movement of a conductive target 7, 8, 9.

The inductive position sensor 1 shown in FIG. 1 comprises a transmitter coil 2, a first receiver coil 3 and a second receiver coil 4.

The inductive position sensor 1 further comprises an oscillator 5 for generating a transmitter signal, which is applied to the transmitter coil 2.

The first receiver coil 3 and the second receiver coil 4 have an angular shape and define the detection range of the inductive position sensor 1. Furthermore, the first receiver coil 3 and the second receiver coil 4 have the same shape and are phase-shifted to each other.

The inductive position sensor 1 shown in FIG. 1 further comprises a first conductive target 7, a second conductive target 8 and a third conductive target 9. For example, the first conductive target 7 and the second conductive target 8 move above the first receiver coil 3 and the second receiver coil 4 along the detection range in the angular movement.

The first conductive target 7 and the second conductive target 8 each have an angular shape extension of half the detection range of the inductive position sensor 1 and are spaced from each other by half the detection range of the inductive position sensor 1. According to the first embodiment shown in FIG. 1, the third conductive target 9 has an angular shape extension of half the detection range of the inductive position sensor 1 and is spaced from the second conductive target 8 by half the detection range of the inductive position sensor 1.

The first receiver coil 3, the second receiver coil 4 and the transmitter coil 2 are arranged on a substrate 6, wherein the first receiver coil 3 and the second receiver coil 4 are superimposed and the transmitter coil 2 encircles the first receiver coil 3 and the second receiver coil 4.

The transmitter coil 2 is connected to the at least one oscillator 5 for generating an electromagnetic field. The generated electromagnetic transmitter field is picked up by the first receiver coil 3 and the second receiver coil 4. If no conductive target is placed above the first receiver coil 3 and the second receiver coil 4, the resulting signal picked up by the first receiver coil 3 and second receiver coil 4 is zero. If one of the conductive targets 7, 8, 9 is placed above the first receiver coil 3 and the second receiver coil 4, the generated electromagnetic field induces eddy currents on the surface of the respective conductive targets 7, 8, 9. The induced eddy currents generate a counter magnetic field, thereby reducing the total flux density underneath. The voltage induced underneath the conductive targets 7, 8, 9 is reduced, creating an imbalance in the signals picked up by the first receiver coil 3 and the second receiver coil 4. Areas that are covered by the conductive targets 7, 8, 9 generate a weaker resulting magnetic field and areas that are not covered by the conductive targets 7, 8, 9 generate a stronger resulting magnetic field.

Depending on the position of the conductive targets 7, 8, 9 above the first receiver coil 3 and the second receiver coil 4, the secondary voltage picked up by the first receiver coil 3 and the second receiver coil 4 is changing in amplitude, allowing the determination of the target's position by analysing this effect. The calculation is performed by a signal processing unit 11, which is connected to the inductive position sensor 1 or integral part of the inductive position sensor 1. According to FIG. 1 the signal processing unit 11 is part of the inductive position sensor 1 and is arranged on the substrate 6.

The detection range of the inductive position sensor 1 is increased to the angular length of the first receiver coil 3 and second receiver coil 4 by providing at least two conductive targets 7, 8, 9, wherein the first conductive target 7 and the second conductive target 8 each have an angular shape extension of half the detection range of the inductive position sensor 1, i.e. the angular length of the first receiver coil 3 and the second receiver coil 4, and are spaced from each other by half the detection range of the inductive position sensor 1, i.e. the angular length of the first receiver coil 3 and the second receiver coil 4.

The spacing between the first conductive target 7, the second conductive target 8 and the third conductive target 9 is fixed, so that the first conductive target 7, the second conductive target 8 and the third conductive target 9 move simultaneously along the angular detection range of the inductive position sensor 1. Thus, the first receiver coil 3 and the second receiver coil 4 are completely covered by the first conductive target 7 respectively the second conductive target 8 or partly by the first conductive target 7 and partly by the second conductive target 8, wherein the sum of the part of the first conductive target 7 and the part of the second conductive target 8 correspond to the area of the first conductive target 7 respectively the second conductive target 8.

The third conductive target 9 is arranged such that it does not cover the first receiver coil 3 or the second receiver coil 4 along the detection range in the angular movement. However, in one end position of the inductive position sensor 1 the third conductive target 9 is arranged next to the first receiver coil 3 or the second receiver coil 4 and covers the transmitter coil 2 in this position. Thereby, the third conductive target 9 reduces the disturbances introduced by the transmitter coil 2 in this end position.

The first conductive target 7 and the second conductive target 8 have the same angular extension and for example cover the first receiver coil 3 and the second receiver coil 4 over the complete radial direction of the inductive position sensor 1.

The angular movement of the first conductive target 7, the second conductive target 8 and the third conductive target 9 is limited to the detection range of the inductive position sensor 1.

The design of the first conductive target 7, the second conductive target 8 and the third conductive target 9 further increases the accuracy of the inductive position sensor 1. Depending on the angular position of the first conductive target 7 and of the second conductive target 8 the area next to the first receiver coil 3 and the second receiver coil 4 in the angular direction is at least one side covered by either the first conductive target 7 or the second conductive target 8. Furthermore, in one end position the area next to the first receiver coil 3 or the second receiver coil 4 in the angular direction is covered by the third conductive target 9. This effectively reduces disturbances, which are for example introduced by the transmitter coil 2 arranged in this area, and thereby enhances the accuracy of the inductive position sensor 1.

FIG. 2 shows a schematic view of parts of a second embodiment of an inductive position sensor 1. The inductive position sensor 1 is an inductive arc position sensor for detecting an angular movement of a conductive target 7, 8.

The inductive position sensor 1 according to the second embodiment comprises a transmitter coil 2, a first receiver coil 3, a second receiver coil 4 and a first conductive target 7 and a second conductive target 8. The second embodiment of FIG. 2 differs from the first embodiment shown in FIG. 1 in that the third conductive target 9 is missing. In all other respects, the inductive position sensors 1 of FIGS. 1 and 2 correspond to each other. In FIG. 2 some parts have been omitted, like e.g., the oscillator 5 for clarity purposes.

FIG. 2 shows that the first receiver coil 3 is wound that it creates two wire loops A and C, which are wound in opposite direction, i.e., clockwise and counterclockwise, depending on the current flowing in them. For instance, the current in the first loop A is flowing counterclockwise, while the current in the second loop C is flowing clockwise. Reversing the polarity of the voltage applied to the terminals of the transmitter coil 2, also reverses the current flow in the first loop A and the second loop C, now creating a clockwise current flow in the first loop A and a counterclockwise current flow in the second loop C. The electromagnetic fields picked up by the first loop A and the second loop C are always of opposite polarity. Consequently, if no conductive target is placed above the first receiver coil 3, the voltage of the receiver signal received by the first receiver coil 3 is zero as the fields generated by the first loop A and the second loop C cancel each other.

Since the second receiver coil 4 has the same shape as the first receiver coil 3 and is only phase-shifted, the second receiver coil 4 accordingly is wound such that it creates two wire loops B and D, which are wound in opposite direction, i.e. clockwise and counterclockwise, depending on the current flowing in them. For instance, the current in the first loop B is flowing counterclockwise, while the current in the second loop D is flowing clockwise. Reversing the polarity of the voltage applied to the terminals of the transmitter coil 2, also reverses the current flow in the first loop B and the second loop D, now creating a clockwise current flow in the first loop B and a counterclockwise current flow in the second loop D. The electromagnetic fields picked up by the first loop B and the second loop D are always of opposite polarity. Consequently, if no conductive target is placed above the second receiver coil 4, the voltage of the receiver signal received by the second receiver coil 4 is zero as the fields generated by the first loop B and the second loop D cancel each other.

FIG. 2 shows the inductive position sensor 1 in one end position. Starting from this end position the first conductive target 7 and the second conductive target 8 move clockwise, so that the first conductive target 7 is continuously covering less of the first receiver coil 3 and the second receiver coil 4, while the second conductive target 8 is continuously covering more of the first receiver coil 3 and the second receiver coil 4. In the other end position the second conductive target 8 is in the position of the first conductive target 7 shown in FIG. 2, while the first conductive target 7 is not covering any of the first receiver coil 3, the second receiver coil 4 and the transmitter coil 2.

As can be seen from FIG. 2, in the shown end position the second conductive target 8 is covering the transmitter coil 2 next the first receiver coil 3 and the second receiver coil 4, which reduces disturbances caused by the transmitter coil 2.

Figure 3:
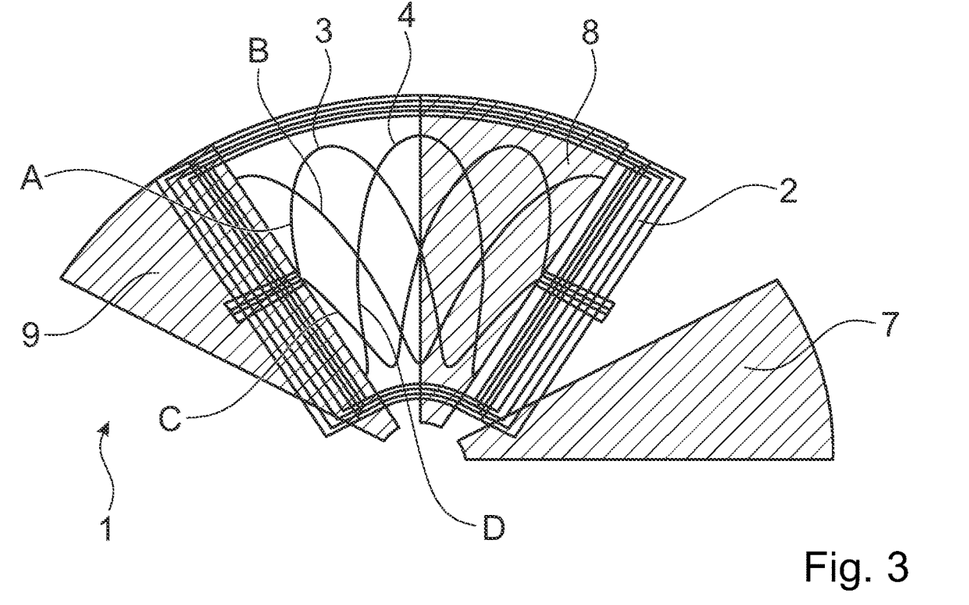

FIG. 3 shows a schematic view of parts of a third embodiment of an inductive position sensor 1. The inductive position sensor 1 is an inductive arc position sensor for detecting an angular movement of conductive targets 7, 8, 9.

The inductive position sensor 1 according to the third embodiment comprises a transmitter coil 2, a first receiver coil 3, a second receiver coil 4 and a first conductive target 7, a second conductive target 8 and a third conductive target 9. The third embodiment of FIG. 3 corresponds to the first embodiment shown in FIG. 1. In FIG. 3 some parts have been omitted, like e.g., the oscillator 5 for clarity purposes.

FIG. 3 shows the inductive position sensor 1 in the other end position compared to the end position shown in FIG. 2. From this end position, the first conductive target 7, the second conductive target 8 and the third conductive target 9 move counterclockwise to the other end position. In that other end position the first conductive target 7 and the second conductive target 8 are in the position as shown in FIG. 2, while the third conductive target 9 is not covering any of the transmitter coil 2, the first receiver coil 3 and the second receiver coil 4.

According to the third embodiment shown in FIG. 3 in both end positions the transmitter coil 2 at the left-hand side of FIG. 3 is covered either by the second conductive target 8 or the third conductive target 9. On the right-hand side the transmitter coil 2 must not be covered in the end position because the first receiver coil 3 and the second receiver coil 4 are covered by either the first conductive target 7 or the second conductive target 8, depending on which end position is reached.

Figure 4:
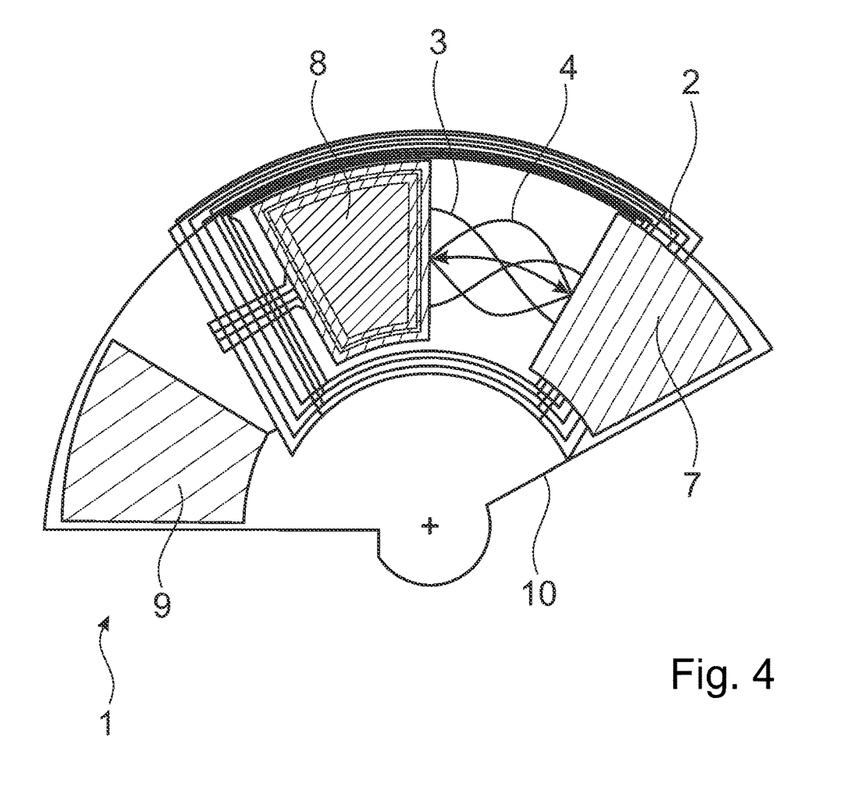

FIG. 4 shows a schematic view of parts of a fourth embodiment of an inductive position sensor 1. This fourth embodiment differs from the third embodiment in that the first conductive target 7, the second conductive target 8 and the third conductive target 9 are arranged on a common substrate 10. This guarantees the spacing between the first conductive target 7, the second conductive target 8 and the third conductive target 9. Furthermore, the first conductive target 7, the second conductive target 8 and the third conductive target 9 move simultaneously due to the common substrate 10. In contrast to this, according to the first embodiment shown in FIG. 1, the first conductive target 7, the second conductive target 8 and the third conductive target 9 are mounted on the same moving part, like a rotational axis 12.

Figure 5:
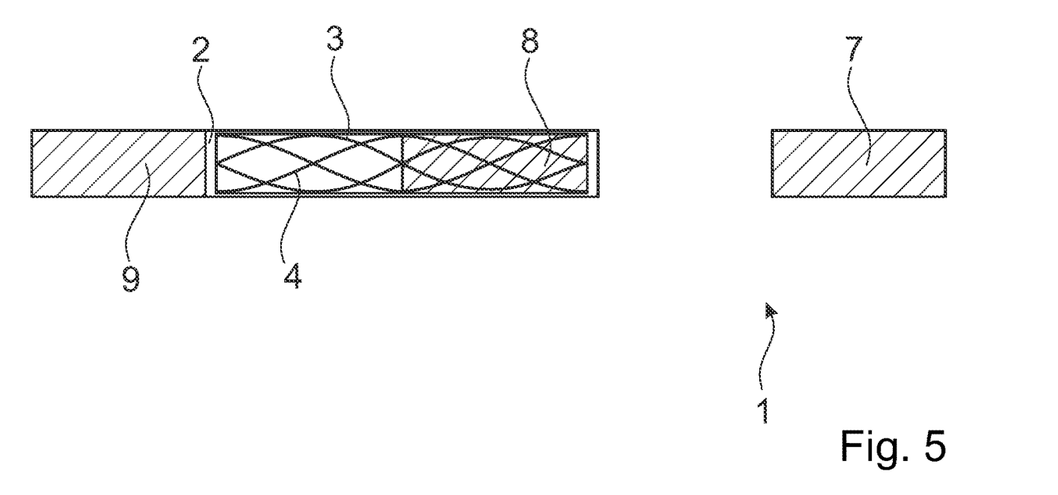

FIG. 5 shows a schematic view of parts of a fifth embodiment of an inductive position sensor 1. The inductive position sensor 1 is an inductive linear position sensor for detecting a linear movement of a conductive target 7, 8, 9. The main difference between the fifth embodiment of FIG. 5 and the previous embodiments shown in FIGS. 1 to 4 is that the first receiver coil 3, the second receiver coil 4 and the encircling transmitter coil 2 are extending in a linear direction and not angular, thereby defining a linear detection range of the inductive position sensor 1. The first conductive target 7, the second conductive target 8 and the third conductive target 9 move in a linear direction within the linear detection range of the inductive position sensor 1. Despite the detection direction the fifth embodiment corresponds to the embodiments shown in FIGS. 1 to 4.

What is claimed is:

1. An inductive position sensor for detecting a linear or angular movement of a conductive target, comprising:
   at least one transmitter coil;
   at least a first receiver coil and a second receiver coil, wherein the first receiver coil and the second receiver coil have the same shape and are phase-shifted to each other, and wherein the first receiver coil and the second receiver coil have a linear or angular shape and define a detection range of the inductive position sensor;
   at least one oscillator for generating a transmitter signal, wherein the transmitter signal is applied to the transmitter coil; and
   at least a first conductive target and a second conductive target,
   wherein movement of the first conductive target and the second conductive target is limited to the detection range of the inductive position sensor such that:
   when the first conductive target and the second conductive target are moved to the first end position, the first conductive target covers a first portion of the at least one transmitter coil without covering the first receiver coil and the second receiver coil; and when the first conductive target and the second conductive target are moved to the second end position, the second conductive target covers a second portion of the at least one transmitter coil without covering the first receiver coil and the second receiver coil, wherein the first conductive target and the second conductive target move above the first receiver coil and the second receiver coil along the detection range in the linear or angular movement, and wherein the first conductive target and the second conductive target each have a linear or angular shape extension of half the detection range of the inductive position sensor and are spaced from each other by half the detection range of the inductive position sensor.

2. The inductive position sensor according to claim 1, further comprising a third conductive target, wherein the third conductive target is spaced from the second conductive target by half the detection range of the inductive position sensor.

3. The inductive position sensor according to claim 2, wherein the third conductive target has a linear or angular shape extension of half the detection range of the inductive position sensor.

4. The inductive position sensor according to claim 2, wherein the first conductive target, the second conductive target and the third conductive target are arranged on a common substrate.

5. The inductive position sensor according to claim 1, wherein the first receiver coil and the second receiver coil each comprise two wire loops, which are wound in opposite directions.

6. The inductive position sensor according to claim 1, wherein the first receiver coil, the second receiver coil and the transmitter coil are arranged on a substrate, and wherein the first receiver coil and the second receiver coil are superimposed.

7. The inductive position sensor according to claim 1, wherein the transmitter coil encircles the first receiver coil and the second receiver coil.

8. The inductive position sensor according to claim 1, wherein the detection range of the inductive position sensor is 180° or less.

9. The inductive position sensor according to claim 1, wherein the detection range of the inductive position sensor is 90° or less.

10. The inductive position sensor according to claim 1, wherein the detection range of the inductive position sensor is 60° or less.

11. The inductive position sensor according to claim 1, wherein the detection range of the inductive position sensor is 30° or less.

12. The inductive position sensor according to claim 1, wherein the first receiver coil, the second receiver coil, the transmitter coil and the at least one oscillator are arranged on a same surface of a substrate.

\* \* \* \* \*